(12) United States Patent
Jaromin et al.

(10) Patent No.: US 8,141,591 B2
(45) Date of Patent: Mar. 27, 2012

(54) PLUG ASSEMBLY WITH MOVEABLE MOUNTING MEMBERS

(75) Inventors: John Jaromin, Chesterfield, VA (US); Joseph Chapman, Chesterfield, VA (US)

(73) Assignee: Alstom Technology Ltd, Baden (CH)

( * ) Notice: Subject to any disclaimer, the term of this patent is extended or adjusted under 35 U.S.C. 154(b) by 316 days.

(21) Appl. No.: 12/542,129

(22) Filed: Aug. 17, 2009

(65) Prior Publication Data

US 2011/0036438 A1 Feb. 17, 2011

(51) Int. Cl.
*F16L 55/10* (2006.01)
(52) U.S. Cl. ............... 138/89; 138/93; 138/94; 220/323
(58) Field of Classification Search ............ 138/89, 138/94, 93
See application file for complete search history.

(56) References Cited

U.S. PATENT DOCUMENTS

| | | | | |
|---|---|---|---|---|
| 3,155,116 | A * | 11/1964 | Ver Nooy | 138/89 |
| 3,593,749 | A | 7/1971 | Reardon | 138/93 |
| 4,387,740 | A * | 6/1983 | Vanzant | 138/89 |
| 4,693,278 | A * | 9/1987 | Wilson et al. | 138/89 |
| 6,286,553 | B1 * | 9/2001 | Morgan | 138/89 |
| 7,036,674 | B2 * | 5/2006 | McGuire | 220/263 |
| 7,665,485 | B2 * | 2/2010 | Fulgosi | 138/89 |
| 2002/0101040 | A1 | 8/2002 | Russell | 277/609 |
| 2005/0121091 | A1 | 6/2005 | Sayers et al. | 138/89 |

FOREIGN PATENT DOCUMENTS

GB 956196 4/1964

OTHER PUBLICATIONS

PCT International Search Report and the Written Opinion of the International Searching Authority, dated Dec. 2, 2010—(PCT/US2010/043041).

* cited by examiner

*Primary Examiner* — Patrick F Brinson
(74) *Attorney, Agent, or Firm* — Michaud-Kinney Group LLP

(57) ABSTRACT

A plug assembly 10 includes a housing 14 and one or more covers 16 coupled to the housing. The plug assembly 10 includes at least one mounting plate 12a, 12b positioned between the housing 14 and the cover 16 for movement relative thereto between an extended position and a retracted position. The plug assembly 10 includes an actuator 17 engageble with the mounting plates 12a, 12b for moving the mounting plates between the extended position and the retracted position in response to a command issued from a controller 62. During operation, the plug assembly 10 is positioned in a conduit 18 and the mounting plates 12a, 12b are moved to the extended position thereby releasably securing the plug assembly at a desired location in the conduit.

14 Claims, 7 Drawing Sheets

PLUG ASSEMBLY WITH MOVEABLE MOUNTING MEMBERS

TECHNICAL FIELD

The present disclosure relates generally to a plug assembly for sealing an aperture, and more particularly, to a plug assembly having moveable mounting members for removably securing the plug assembly inside a pipe.

BACKGROUND OF THE INVENTION

Generally pipes and other conduits have operational and design limits that when exceeded can have very detrimental consequences. For example, depending on operating conditions, a pipe wall could rupture resulting in loss of whatever is flowing through the pipe. Such a rupture causes performance degradation and downtime for repair. Moreover, portions of the pipe may be located in areas that are difficult to access. Thus, if the rupture occurs at such a location, access and repair could prove to be difficult, costly and time consuming.

SUMMARY OF THE INVENTION

According to aspects illustrated herein, there is provided a plug assembly including a housing and one or more covers coupled to the housing. The plug assembly includes at least one mounting plate positioned between the housing and the cover for movement relative thereto between an extended position and a retracted position. The plug assembly includes an actuator engageble with the mounting plates for moving the mounting plates between the extended position and the retracted position in response to a command issued from a controller. During operation, the plug assembly is positioned in a conduit and the mounting plates are moved to the extended position thereby releasably securing the plug assembly at a desired location in the conduit.

According to other aspects illustrated herein, a plug assembly includes a housing defining an internal cavity and at least one lug projecting outwardly from the housing. The plug assembly includes at least one cover coupled to the housing. A first mounting plate and a second mounting plate are each positioned between the housing and the cover for movement relative thereto between a retracted position and an extended position. The first mounting plate has at least one first slot extending therethrough and through which the lug extends. The second mounting plate has at least one second slot extending therethrough and through which another of the lugs extends. The first mounting plate has a first edge and the second mounting plate has a second edge, wherein the first edge and the second edge face one another and each of the first edge and the second edge have a threaded bore extending therein. The plug assembly includes a rod having a central driving portion disposed between a first threaded portion of the rod and a second threaded portion of the rod. The first threaded portion comprises a left handed thread engaged with the first threaded bore and the second threaded portion comprises a right handed thread engaged with the second threaded bore. The plug assembly also includes an actuator at least a portion of which extends into the internal cavity. The actuator is engageable with the central driving portion for moving the mounting plates between the extended and retracted positions in response to a command issued from a controller. During operation the plug assembly is positioned in a conduit and the mounting plates are moved to the extended position thereby releasably securing the plug assembly at a desired location in the conduit.

According to other aspects illustrated herein, the plug assembly is used to seal a gas turbine cooling air pipe that has a rupture therein. The plug assembly, with the mounting plates in the retracted position can be positioned inside the pipe with the use of cables connected to the plug assembly. The plug assembly is sized such that the housing fits through the pipe. When the plug assembly is installed in the pipe, the actuator is remotely powered and controlled to move the mounting plates into the extended position, such that the curved perimeter engages an inside surface of the pipe, thereby removably securing the plug assembly inside the pipe.

The above described and other features are illustrated by the following figures and detailed description.

BRIEF DESCRIPTION OF THE DRAWINGS

Referring now to the Figures, which are exemplary embodiments, and wherein the like elements are numbered alike.

DETAILED DESCRIPTION OF PREFERRED EMBODIMENTS

Figure 1:
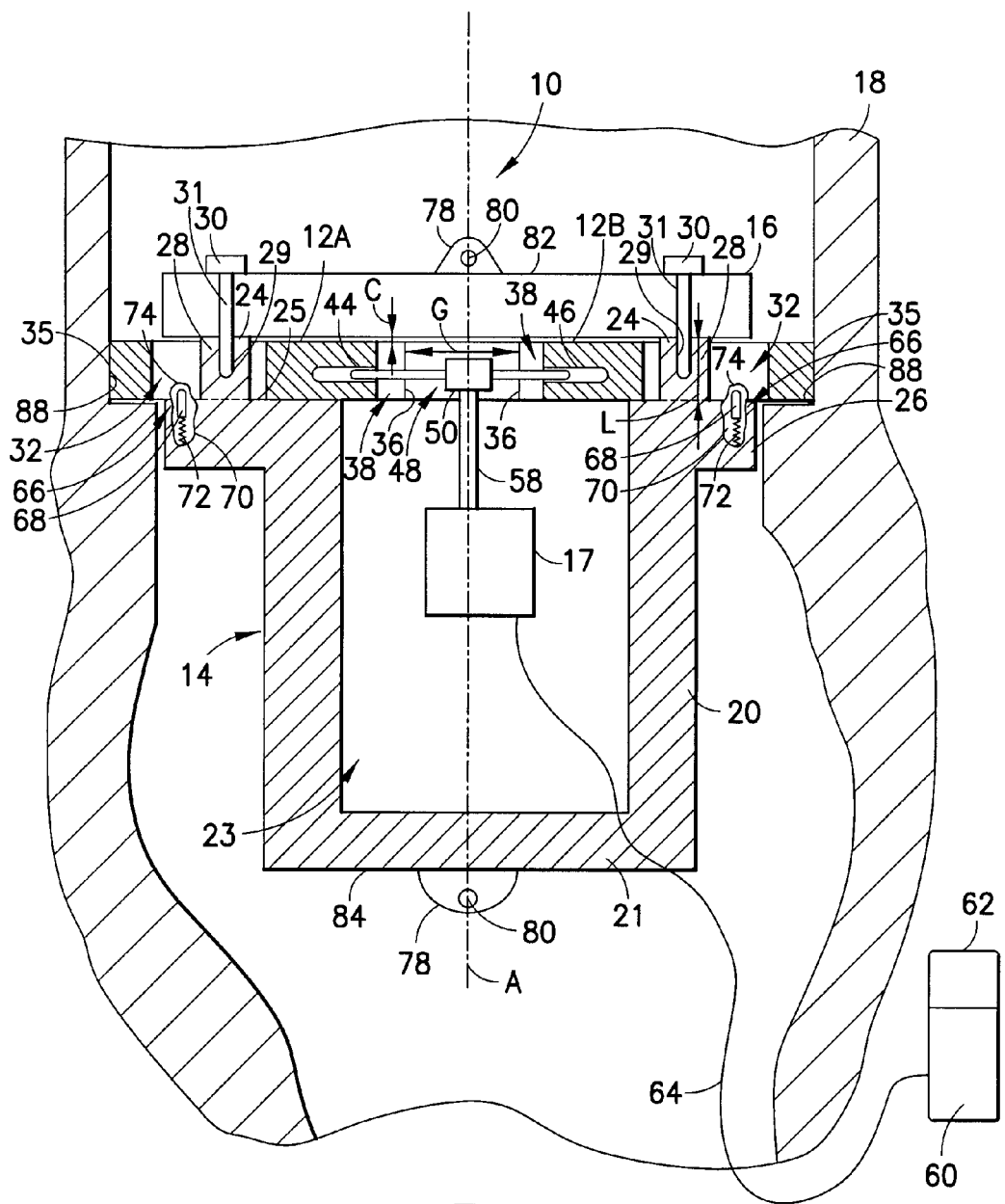
FIG. 1 is a cross sectional view of a plug assembly.
Figure 2:
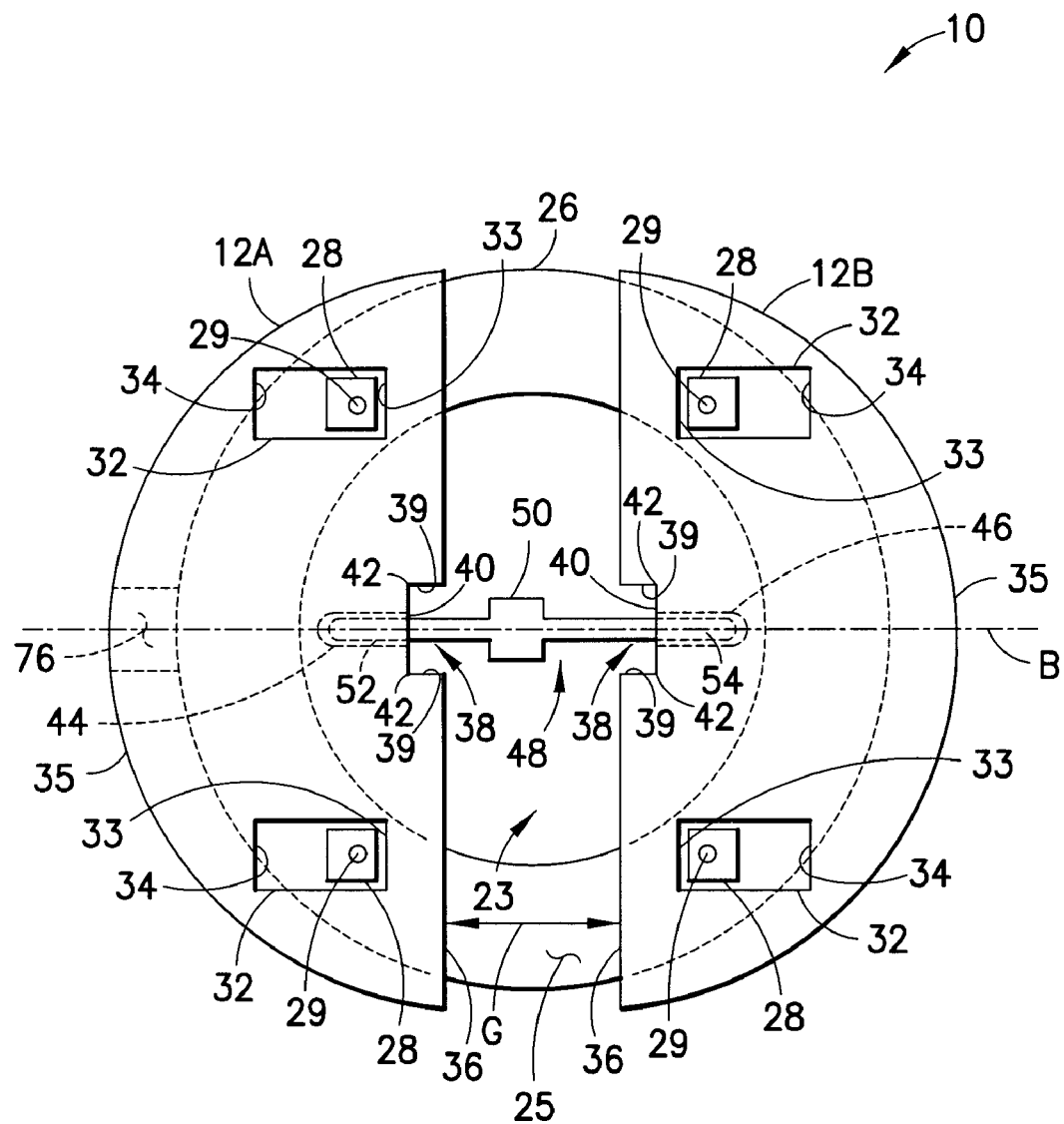
FIG. 2 is a top view of the plug assembly of FIG. 1, shown in an extended position without a cover.

As shown in FIGS. 1 and 2, a plug assembly 10 includes two mounting plates 12a, 12b, positioned between a housing 14 and cover 16. The mounting plates 12a, 12b are moveable relative to the housing 14 and the cover 16. As will be explained below in greater detail, the movement of the mounting plates in the illustrated embodiment is facilitated by an actuator 17. The actuator 17 is disposed in the housing 14 and moveably engages the mounting plates 12a, 12b, for movement of the mounting plates between a retracted position and an extended position. The plug assembly 10 is shown positioned in a pipe 18 with the mounting plates 12a, 12b in the extended position. While two mounting plates 12a, 12b are shown and described, it is contemplated that the plug assembly 10 can accommodate other configurations including but not limited to one mounting member, more than two mounting members and/or mounting members of other configurations and shapes. Although the cover 16 is shown in the illustrated embodiment as being circular, the plug assembly 10 is not limited in this regard as more than one cover of any suitable shape including but not limited to squares and rectangular covers can be employed.

The housing 14 is defined by a substantially cylindrical wall 20 and an integral base portion 21. The wall 20 and the base portion 21 collectively define a cavity 23 in the housing. The housing 14 can be of any suitable size or shape. The base portion of the housing, while being shown and described as being integral with the housing wall, the housing is not limited in this regard as the base can also be threaded onto the wall, fastened using screws, welded, glued or a combination thereof.

An annular flange 26 extends radially outwardly from the wall 20 and is positioned opposite the base portion 21. The annular flange 26 is substantially coaxial with a central axis A of the housing 14 and has an outwardly facing surface 25 substantially perpendicular to the central axis. The annular flange 26 is shown in the illustrated embodiment with four guide lugs 28 projecting outwardly from the surface 25. Each of the guide lugs 28 defines a threaded bore 29 formed therein and extending at least partially therethrough. The cover 16 is secured to the mounting surfaces 24 on the guide lugs 28 by fasteners 30 extending through apertures 31 formed in the cover, the fasteners being threadably engaged with the threaded bores 29. The guide lugs 28 have a length L suitable to create a clearance C between the cover 16 and the mounting plates 12a, 12b to facilitate movement of the mounting plates relative to the cover and the housing 14. While the annular flange 26 is described as extending radially outwardly from the wall 20 and the four guide lugs 28 projecting outwardly from the surface 25, other configurations including but not limited to those with any number of guide lugs, with no annular flange, and with guide lugs projecting outwardly from the wall can also be employed without departing from the broader aspects disclosed herein.

Still referring to FIGS. 1 and 2, each of the mounting plates 12a, 12b defines two guide slots 32 extending therethrough. Each of the guide slots 32 has an extended positioned abutment surface 33 and a retracted position abutment surface 34 formed on opposing ends of each of the guide slots. While the mounting plates 12a, 12b are described as each having two apertures in the form of guide slots 32, the mounting plates can be adapted to employ any number of apertures.

Each of the mounting plates 12a, 12b is semi-circular and includes an edge 36. A recess 38 is defined in each of the mounting plates 12a, 12b approximately midway along the edge 36. The recess 38 is defined by two inwardly extending walls 39 and a base portion 40 extending between an inward most portion 42 of the walls 39. A first threaded bore 44 extends substantially perpendicularly from the base portion 40 of the recess 38 into the mounting plate; and a second threaded bore 46 extends substantially perpendicularly from base portion 40 of the recess 38 into the mounting plate, such that the first and second threaded bores are substantially coaxial with axis B. The first threaded bore 44 defines left handed threads and the second threaded bore 46 has right handed threads. Although the first and second threaded bores 44 and 46, respectively, are described as being coaxial and the first threaded bore having left handed threads and the second threaded bore having right handed threads, any number of bores, configured in any orientation, with or without threads can be employed.

Figure 3:
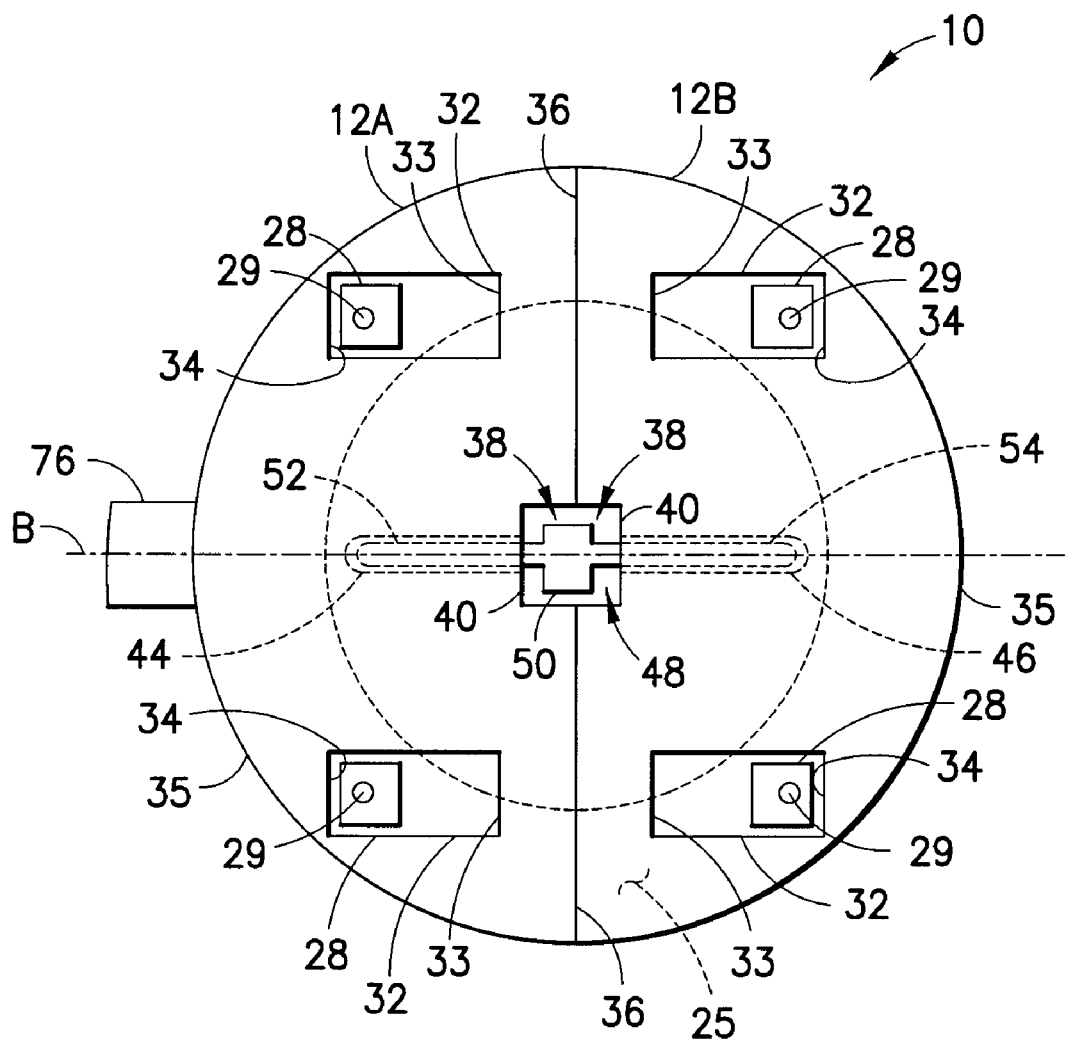
FIG. 3 is a top view of the plug assembly of FIG. 1, shown in a retracted position without the cover.

As illustrated in FIGS. 1 and 2, each of the mounting plates 12a, 12b are positioned on the flange surface 25 with the guide lugs 28 extending through respective ones of the guide slots 32. When the mounting plates 12a, 12b are in the extended position illustrated in FIGS. 1 and 2, a portion of each of the guide lugs 28 is adjacent to the extended position abutment surface 33 of the respective guide slot. In the extended position, the edges 36 are spaced apart from one another by a distance G. Referring to FIG. 3, the mounting plates 12a, 12b are shown in a retracted position with the a portion of the edges 36 abutting one another and a portion of each of the guide lugs 28 positioned adjacent to the retracted position abutment surface 34.

Referring to FIGS. 1-3, the mounting plates 12a, 12b are moveably coupled to one another by a rod 48 having a central driving portion 50 disposed between a first threaded portion 52 of the rod and a second threaded portion 54 of the rod. Suitable configurations of the driving portion 50 include, for example, a helical gear, a sheave or a toothed gear. The first threaded portion 52 has left handed threads and the second threaded portion 54 has right handed threads, formed on the rod 48. The first threaded portion 52 of the rod 48 is engaged with the first threaded bore 44; and the second threaded portion 54 of the rod 48 is engaged with the second threaded bore 46. Rotation of the rod 48 about the axis B in a first direction causes the mounting plates 12a, 12b to move apart from one another towards the extended position; and rotation of the rod 48 about the axis B in a second direction opposite to the first direction causes the mounting plates 12a, 12b to move towards one another into the retracted position. When in the retracted position, the central driving portion 50 is positioned within the recess 38 providing clearance so that the edges 36 can abut one another, as shown in FIG. 3.

As shown in FIG. 1, the actuator 17 is disposed in the cavity 23 and is rotatably coupled to the driving portion 50 of the rod 48 by a suitable drive 58, for example by a helical gear train, a belt drive or a chain drive (not shown). Suitable actuators include electric motors and pneumatic rotary motion actuators. The actuator 17 is coupled to a remote power supply 60 and controller 62 by suitable connectors 64, for example by electrical conductors. The power supply and the controller can be located outside of the housing 14, for example outside of the pipe 18. The controller 62 is configured to operate the actuator 17 to move the mounting plates 12a, 12b between the retracted position and the extended position in response to one or more control signals or commands. While electric motors and pneumatic rotary motion actuators 17 coupled to a helical gear train, a belt drive or a chain drive is described, other actuator configurations, including but not limited linear motion actuators such as a piston/cylinder assembly for use with pneumatic and/or hydraulic fluids and a motor having a common shaft extending from opposing sides of the motor can be employed without departing from the broader aspects disclosed herein. While the actuator 17 is described as being coupled to the controller 62 by electrical conductors, other controllers can be employed such as those using wireless communication. Although the power supply 60 is described as being positioned outside of the pipe 18, it is contemplated that the power supply 60 could be positioned in the cavity 23, for example a battery.

As shown in FIG. 1, the plug assembly 10 includes a detent mechanism 66 for releasably securing each of the mounting plates 12a, 12b in the extended position. Each of the detent mechanisms 66 include a detent member 68 disposed in a bore 70 formed in the flange 26. A spring 72 acts on the detent member 68 to urge the detent member out of the bore 70 and into a depression 74 formed in respective portions of each mounting plate 12a, 12b.

As illustrated in FIGS. 2 and 3, in one embodiment, the plug assembly 10 includes a tab 76 radially projecting from the flange 26 for use in limiting inadvertent movement or dislodgement of the plug assembly 10 from a position in the pipe 18. The plug assembly 10 includes a lug 78, having an eyelet 80 extending therethrough, mounted on an outwardly facing portion 82 of the cover 16 and another lug 80 mounted on an outwardly facing portion 84 of the base 21. Cables, wire, chain or the like can be removably coupled to the lugs 78 for positioning the plug assembly 10 inside the pipe 18 and removing the plug assembly from the pipe.

The plug assembly 10, including the housing 14, the flange 26, the mounting plates 12a, 12b, and the cover 16 are manufactured from a material suitable for use at temperatures of about 400° C. and pressures of about $3.1 \times 10^6$ Pascal. It is appreciated that, while the plug assembly 10 can typically be used at temperatures of about 400° C. and pressures of about $3.1 \times 10^6$ Pascal. The plug assembly can be used with the proper materials in temperatures and pressures exceeding these. It should also be understood that the plug assembly can also be used at temperatures less that 400° C. and pressures less than $3.1 \times 10^6$ Pascal. The plug assembly 10, including the housing 14, the flange 26, the mounting plates 12a, 12b, and/or the cover 16 can be made from metal, however depending on the operating condition, other materials such as but not limited to rubber, synthetic rubber, plastics, elastomeric materials, composite materials and combinations thereof can also be employed.

The plug assembly 10 finds utility in sealing pipes that have ruptured, especially gas turbine cooling air pipes that have ruptured. Portions of the cooling air pipe can be contained within an enclosure and can become difficult to access during operation of the gas turbine. Referring to FIG. 1, the plug assembly 10, with the mounting plates 12a, 12b in the retracted position can be positioned inside the pipe 18 with the use of cables (not shown) connected to the lugs 78. The plug assembly 10 is sized such that the housing 14 fits through the pipe 18. When the plug assembly 10 is installed in the pipe 18, the actuator 17 can be remotely powered and controlled to move the mounting plates 12a, 12b into the extended position, such that the curved perimeter 35 engages an inside surface 88 of the pipe 18, thereby removably securing the plug assembly inside the pipe without having to fully curtail operation of the gas turbine by opening the enclosure.

The plug assembly 10 can be removed from the pipe 18 by operating the actuator 17 to move the first mounting plate 12a and second mounting plate 12b to a retracted position. The plug assembly 10 is removed from the inside of the pipe 18 by withdrawing the connector from the pipe.

Figure 4:
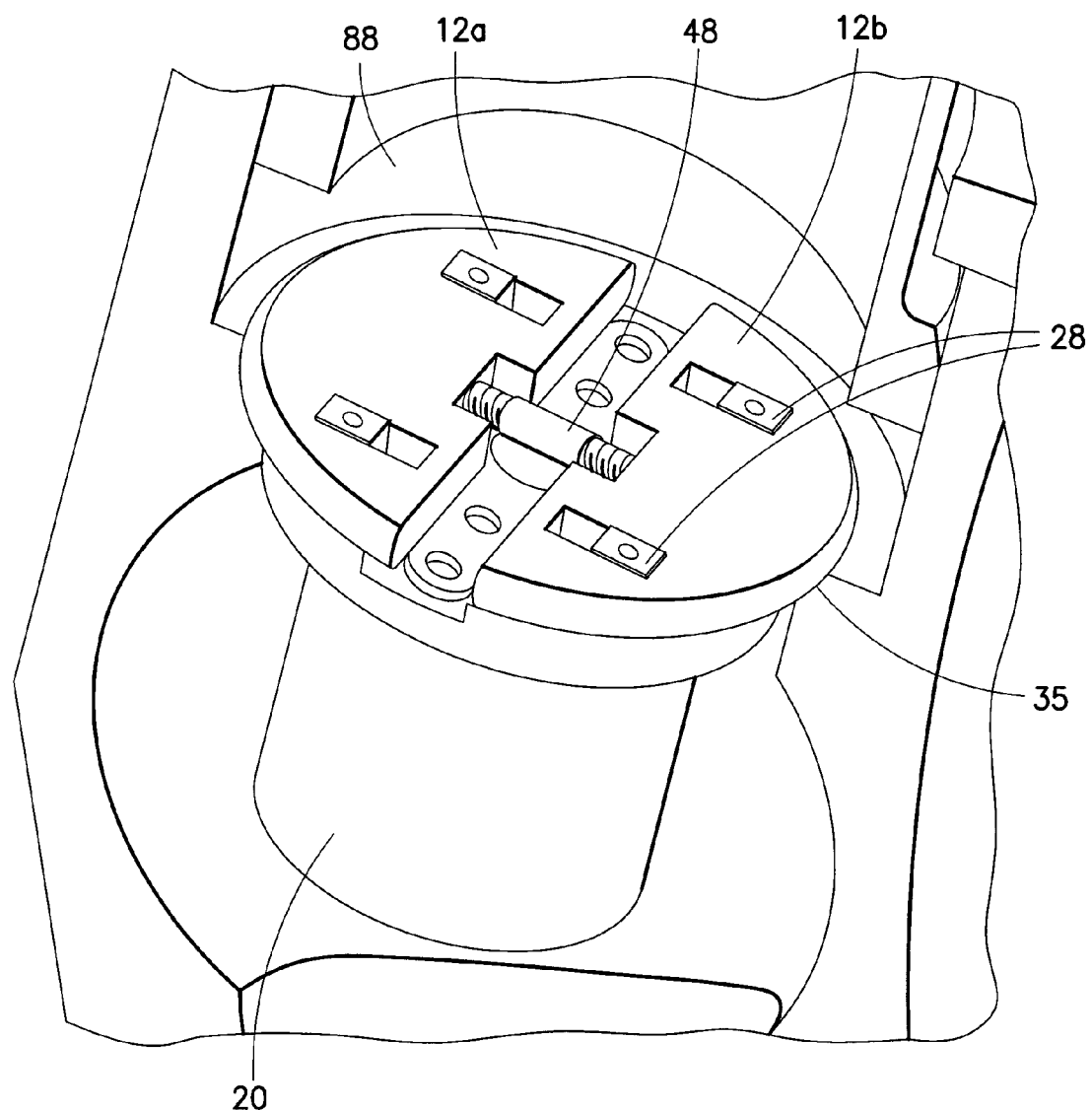
FIG. 4 is a perspective view of the plug assembly according to one embodiment of the present invention, shown in a retracted position without its cover.

FIG. 4 is a perspective view of the plug assembly according to one embodiment of the present invention, shown in a retracted position without its cover.

Here the inside surface 88 is visible. The curved perimeter 35 of base plates 12a and 12b are adjacent the inside surface 88. Rod 48 and guide lugs 28 can also be seen from this view.

Figure 5:
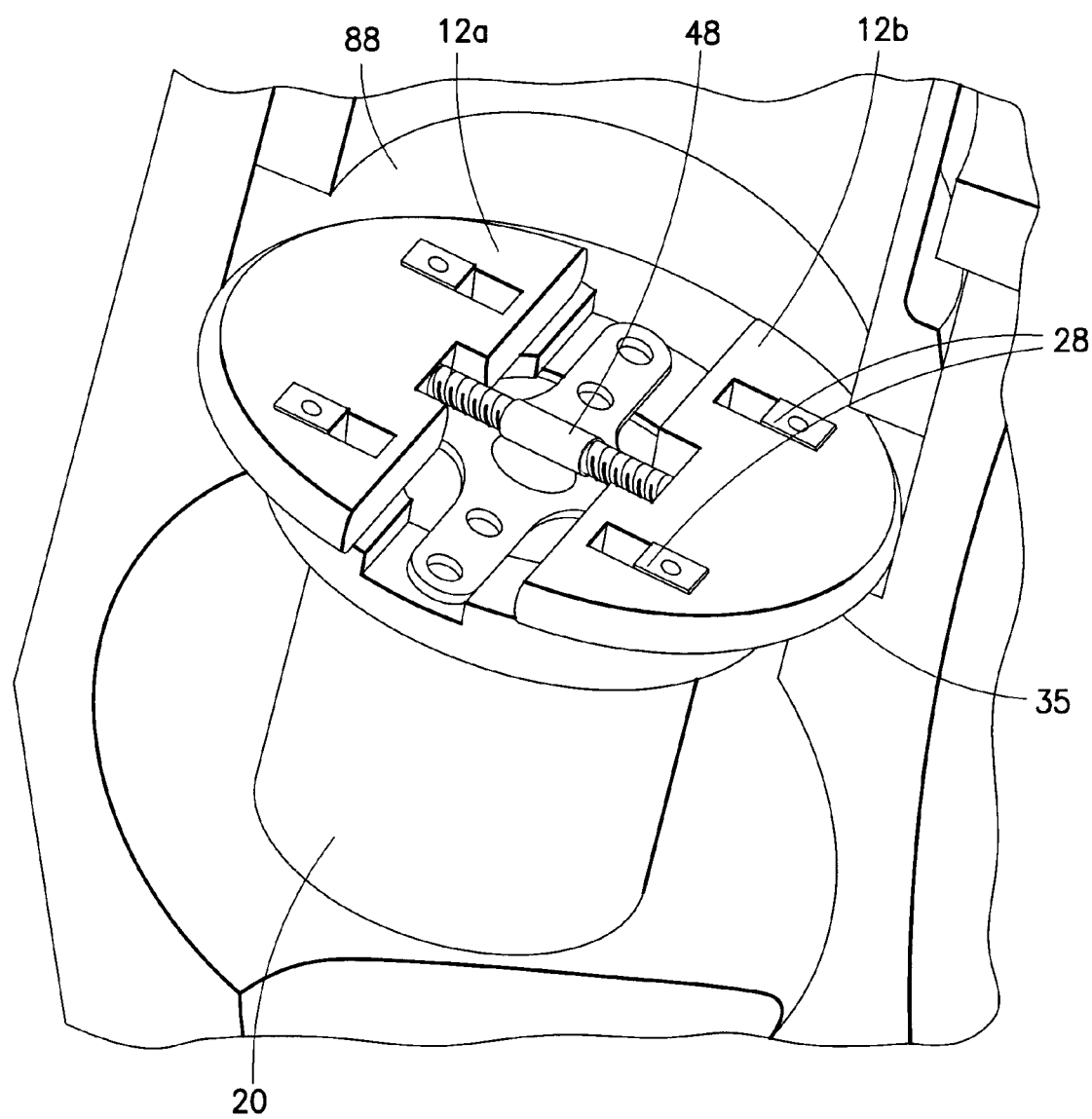
FIG. 5 is a perspective view of the plug assembly according to one embodiment of the present invention, shown in an extended position without its cover.

FIG. 5 is a perspective view of the plug assembly according to one embodiment of the present invention, shown in an extended position without its cover.

Rod 48 rotates pushing base plates 12a, 12b apart and causing the curved perimeter 35 5o press against inside surface 88 sealing the tube.

Figure 6:
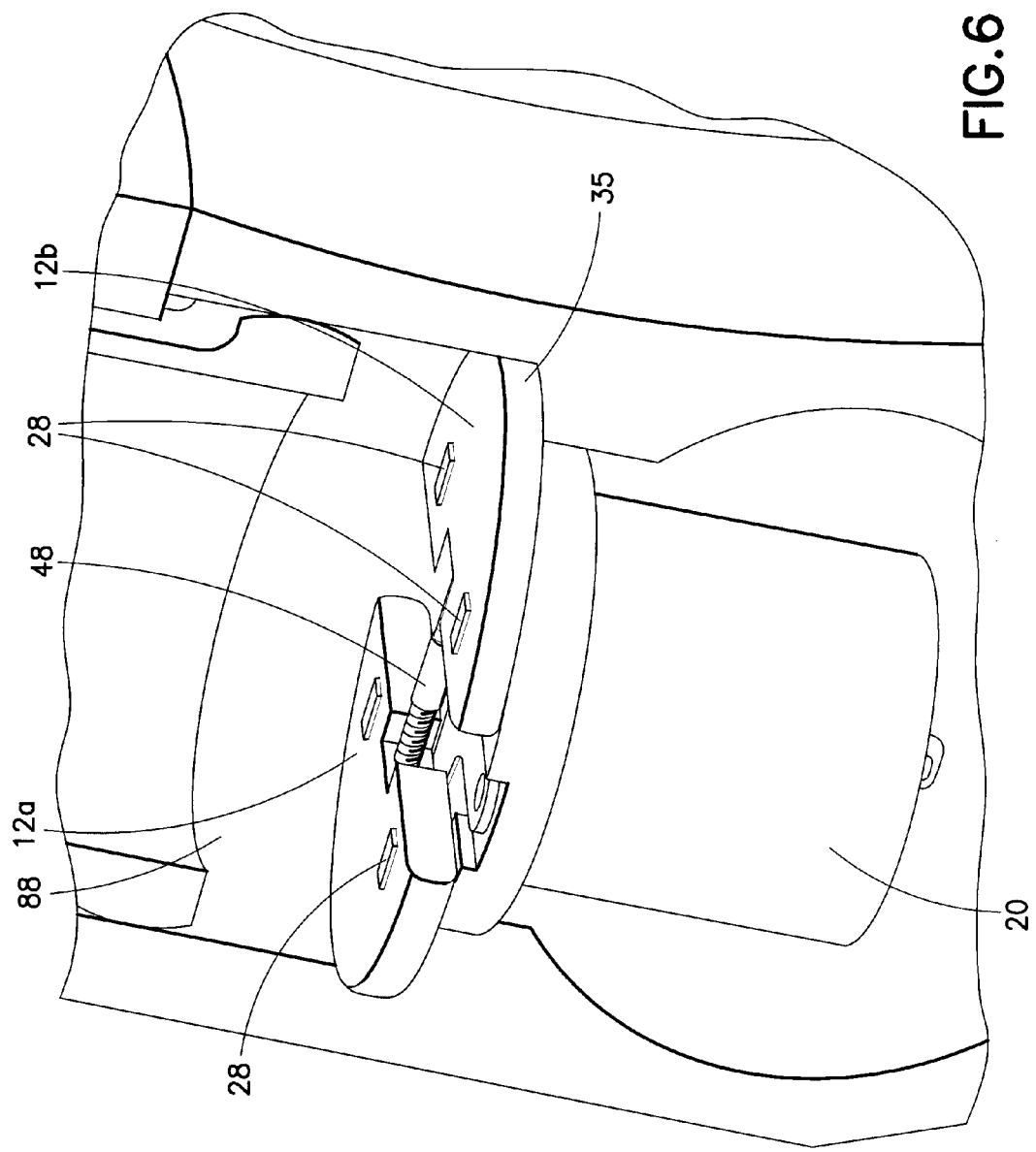
FIG. 6 is another perspective view of the plug assembly according to one embodiment of the present invention, shown in an extended position without its cover.

FIG. 6 is another perspective view of the plug assembly according to one embodiment of the present invention, shown in an extended position without its cover.

From this view, it can be seen that the curved surface 35 of base plates 12a, 12b come in contact with inner surface 88.

Figure 7:
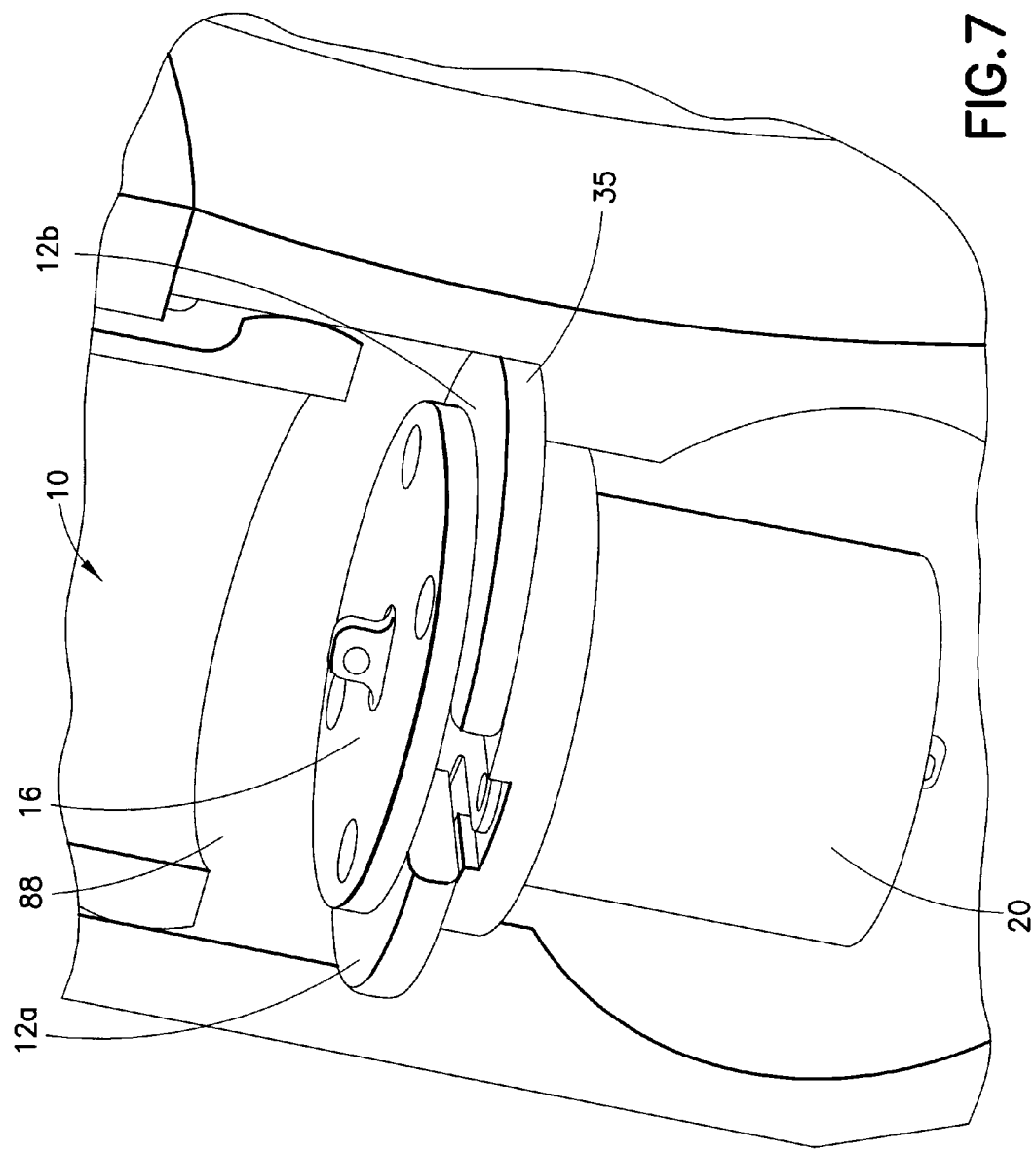
FIG. 7 is a perspective view of the plug assembly according to one embodiment of the present invention, shown in an extended position with its cover.

FIG. 7 is a perspective view of the plug assembly according to one embodiment of the present invention, shown in an extended position with its cover. Once base plate 12a, 12b have been extended to hold plug 10 in position, the cover 16 is secured to plug 10 to old it in place.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A plug assembly comprising:
a housing;
at least one cover coupled to said housing;
at least one mounting plate positioned between said housing and said cover for movement relative thereto between an extended position and a retracted position;
an actuator engageable with said mounting plates for moving said mounting plates between said extended position and said retracted position in response to a command issued from a controller; and wherein during operation said plug assembly is positioned in a conduit and said mounting plates are moved to said extended position thereby releasably securing said plug assembly at a desired location and sealing said conduit;
said at least one mounting plate includes a first mounting plate and a second mounting plate, each being movable in generally opposite directions between said extended position and said retracted position; and
said first mounting plate and said second mounting plate are moveably coupled to one another by a rod having a central driving portion disposed between a first threaded portion of said rod and a second threaded portion of said rod, said first and second threaded portions of said rod each being threadably engaged with one of said first and second mounting plates.

2. The plug assembly of claim 1 wherein said housing defines an internal cavity and at least a portion of said actuator extends into said internal cavity.

3. The plug assembly of claim 1 wherein said housing defines at least one lug projecting outwardly therefrom with said at least one cover being removably positioned on said at least one lug and wherein said at least one mounting plate defines at least one aperture extending therethrough and through which said at least one lug extends.

4. The plug assembly of claim 1 wherein said actuator comprises one of a motor and a piston and cylinder assembly.

5. The plug assembly of claim 1 wherein said first threaded portion of said rod comprises a left handed thread and said second threaded portion of said rod comprises a right handed thread.

6. The plug assembly of claim 1 wherein said housing includes a tab projecting radially therefrom.

7. The plug assembly of claim 1 further comprising at least one detent mechanism positioned between said housing and said at least one mounting plate.

8. The plug assembly of claim 1 further comprising connector means mounted on at least one of said housing and said cover.

9. The plug assembly of claim 1 further comprising a power supply positioned outside of said housing for supplying power to said actuator.

10. The plug assembly of claim 1 further comprising a controller positioned outside of said housing for controlling operation of said actuator.

11. The plug assembly of claim 1 wherein at least one of said housing, said at least one mounting plate and said cover are manufactured from metal.

12. The plug assembly of claim 1 wherein at least one of said housing, said at least one mounting plate and said cover are manufactured at least one of rubber, synthetic rubber, plastic, an elastomeric materials and a composite material.

13. The plug assembly of claim 1 wherein said actuator comprises a motor having a shaft extending from opposing sides of said motor and wherein said shaft moveably couples said first mounting plate to said second mounting plate.

14. A plug assembly comprising:

a housing defining an internal cavity and at least one lug projecting outwardly from said housing;

at least one cover coupled to said housing;

a first mounting plate and a second mounting plate each positioned between said housing and said cover for movement relative thereto between a retracted position and an extended position, said first mounting plate having at least one first slot extending therethrough and through which said at least one lug extends and said second mounting plate having at least one second slot extending therethrough and through which another of said at least one lugs extend, said first mounting plate having a first edge and said second mounting plate having a second edge, wherein said first edge and said second edge face one another and each of said first edge and said second edge have a threaded bore extending therein;

a rod having a central driving portion disposed between a first threaded portion of said rod and a second threaded portion of said rod, said first threaded portion comprises a left handed thread engaged with said first threaded bore and said second threaded portion comprises a right handed thread engaged with said second threaded bore; and an actuator at least a portion of which extends into said internal cavity, said actuator being engageable with said central driving portion for moving said mounting plates between said extended position and said retracted position in response to a command issued from a controller and wherein during operation said plug assembly is positioned in a conduit and said mounting plates are moved to said extended position thereby releasably securing said plug assembly at a desired location in said conduit.

* * * * *